(12) United States Patent
Tyrrell

(10) Patent No.: US 9,838,142 B2
(45) Date of Patent: Dec. 5, 2017

(54) ELECTRICAL CONDUCTOR TO OPTICAL INPUT CONVERSION SYSTEM

(71) Applicant: Christopher B. Tyrrell, Troy, MO (US)

(72) Inventor: Christopher B. Tyrrell, Troy, MO (US)

( * ) Notice: Subject to any disclaimer, the term of this patent is extended or adjusted under 35 U.S.C. 154(b) by 280 days.

(21) Appl. No.: 14/883,692

(22) Filed: Oct. 15, 2015

(65) Prior Publication Data

US 2016/0112144 A1   Apr. 21, 2016

Related U.S. Application Data

(60) Provisional application No. 62/064,224, filed on Oct. 15, 2014.

(51) Int. Cl.
*H04B 10/00* (2013.01)
*H04B 10/80* (2013.01)
*G02B 6/42* (2006.01)

(52) U.S. Cl.
CPC ......... *H04B 10/802* (2013.01); *G02B 6/4261* (2013.01); *G02B 6/4278* (2013.01); *G02B 6/4266* (2013.01)

(58) Field of Classification Search
CPC ...... H04B 10/40; H04B 10/801; H04B 10/25; H04B 10/802; G02B 6/4278; G02B 6/4261; G02B 6/3897; G02B 6/4295; G02B 6/4228
USPC ....... 398/135, 136, 137, 138, 139, 140, 141, 398/158, 159, 164, 79, 59; 385/88, 89, 385/90, 92, 93, 14
See application file for complete search history.

(56) References Cited

U.S. PATENT DOCUMENTS

| | | |
|---|---|---|
| 4,732,446 A | 3/1988 | Gipson |
| 5,307,346 A | 4/1994 | Fieldhouse |
| 5,428,769 A | 6/1995 | Glaser |
| 5,970,226 A | 10/1999 | Hoy |
| 6,243,509 B1 | 6/2001 | Chen |
| 6,845,184 B1 | 1/2005 | Yoshimura |
| 7,112,885 B2 | 9/2006 | Chen |
| 7,444,041 B1 | 10/2008 | Chen |
| 7,457,491 B2 | 11/2008 | Chen |
| 7,529,448 B2 | 5/2009 | Chen |
| 7,786,919 B2 | 8/2010 | Parfitt |
| 8,098,993 B2 | 1/2012 | Kirkpatrick |
| 8,352,651 B2 | 1/2013 | Parfitt |

(Continued)

*Primary Examiner* — Hanh Phan
(74) *Attorney, Agent, or Firm* — Charles McCloskey

(57) ABSTRACT

A system uses optical signals to monitor real world inputs and convert them to electrical signals for conventional indication and control systems. Optical signals see use where electrical signals cannot and improve reliability of existing control systems. Optical loops extend to peripheral devices which process the light into discrete or analog light signals. A receiving circuit interprets that signal and converts it to a useable electrical signal of discrete or analog form. The system operates within a range of light wavelength from at least as low as 399 nm up to at least as high as 1801 nm. The system replaces electrical conductors for input cards of Programmable Logic Controller systems. The optical sensing devices withstand electrical surges and immersion into water, do not generate electrical noise, allow for maintenance without shock hazard, and lack susceptibility to electrical or magnetic phenomenon.

20 Claims, 6 Drawing Sheets

(56) References Cited

U.S. PATENT DOCUMENTS

| | | |
|---|---|---|
| 8,532,500 B1 | 9/2013 | Wach |
| 2004/0037512 A1 | 2/2004 | Cho |
| 2008/0080577 A1* | 4/2008 | Nguyen ................ H04B 10/40 |
| | | 372/38.02 |
| 2008/0107422 A1* | 5/2008 | Cole ....................... H03M 9/00 |
| | | 398/135 |

* cited by examiner

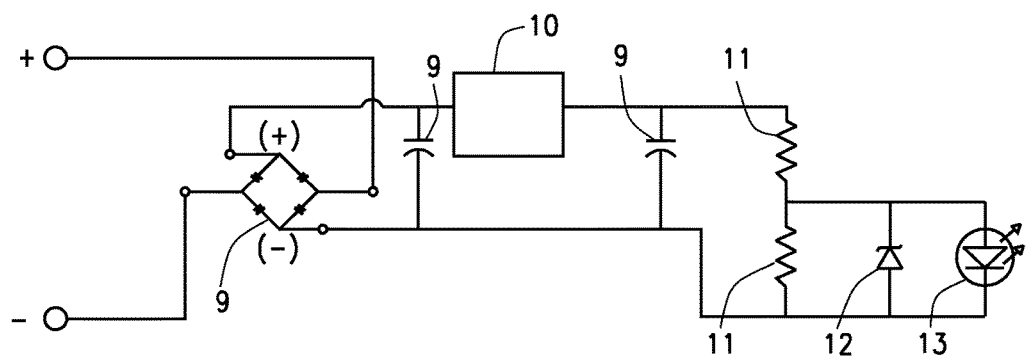
F I G . 4
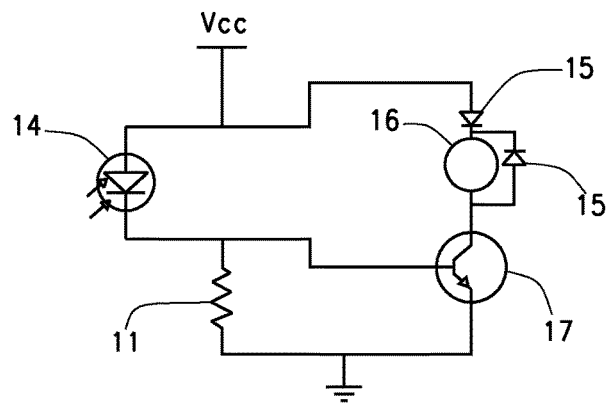
F I G . 5

ELECTRICAL CONDUCTOR TO OPTICAL INPUT CONVERSION SYSTEM

CROSS-REFERENCE TO RELATED APPLICATION

This non-provisional application claims priority to pending provisional application No. 62/064224 filed on Oct. 15, 2014, all of which are owned by the same inventor.

BACKGROUND OF THE INVENTION

The electrical conductor to optical input conversion system generally relates to electro-optics and more specifically to an optical switch.

Programmable Logic Controller (PLC) based input utilizes of small direct current, or DC, voltages and currents. Input cards recognize signals from real world interactions and translate them from electrical signals to data used for control and indication as needed for the PLC system. Discrete input, or digital input cards, send out an electric signal, and look for an on or off state of that signal to be returned through a real world peripheral device.

Analog input cards measure voltages, typically 0-5 v DC, or currents, typically 4-20 mA, to determine real world peripheral device input. These analog cards work in most applications, but still fall short when electrical surges, induced voltages, magnetic field distortions, lightning damage, or any other electrical based phenomenon occur in the real world at the sensing peripheral device.

DESCRIPTION OF THE PRIOR ART

Over the years, various optically related switches have appeared in the industry. Existing limit switches manipulate optic signals, but their production has halted do to a lack of system implantation and operation issues with mirrors that this system specifically avoids. Also, analog signals have yet to draw much attention from industry to this point.

The U.S. patent to Gipson, U.S. Pat. No. 4,732,446 expired in 2005 by passage of time from issuance. Gipson provides a chip carrier of a printed circuit board with an optical data bus, see FIG. 1. The chip carrier may be stacked as in FIG. 15. The chip carrier has a transparent window side wall as reference character 30 with a beam splitter 32.

The U.S. patent to Fieldhouse, U.S. Pat. No. 5,307,346 expired in 2006 by failure to pay the third maintenance fee. Fieldhouse has a network field interface between a host computer and field devices. The interface utilizes READ, WRITE services through I/O ports. The interface provides digital interfacing. Fieldhouse describes a network field interface as at 12, c. 4 I. 66.

The U.S. patent to Glaser, U.S. Pat. No. 5,428,769 expired in 2007 by failure to pay the third maintenance fee. Glaser has a system of trios of computer units in bi-directional communication. The communication includes input and output signals subject to electronic arbitration and adjusted through software. The system utilizes HIGH, LOW, SAFE, and LAST conditions in the arbitration processes. The interface provides digital interfacing. Glaser describes its system as at 10 formed from triply redundant computer units as at 12, c. 4 I. 50-52.

The U.S. patent to Hoy, U.S. Pat. No. 5,970,226 expired in 2007 by failure to pay the second maintenance fee. Hoy also has a system of computer trios in bi-directional communication. The communication includes input and output signals subject to electronic arbitration and adjusted through software. The system utilizes HIGH, LOW, SAFE, and LAST conditions in the arbitration processes. Hoy appears related to Glaser though being four years younger. Hoy's system has a digital interface from its system as at 10 formed from triply redundant computer units as at 12, c. 4 I. 50-52.

The U.S. patent to Chen, U.S. Pat. No. 6,243,509, recently expired in 2013 by failure to pay the third maintenance fee. Chen '509 shows an optical signaling system within two layers 118, 120 of a circuit board. The system includes a waveguide 116, an optical to electrical receiver 124, and a reflector 126, see c. 4 I. 29-39.

The next U.S. patent to Chen, U.S. Pat. No. 7,112,885, recently expired in October 2014 by failure to pay the second maintenance fee. Chen '885 shows an optical signaling system within of a circuit board and more particularly a heat sink 110, 200 made into the circuit board. The heat sink has further description here, c. 9 I. 51 along with the circuit board 104 c. 9 I. 58. This patent also includes an electrical to optical transmitter identified as a laser, c. 10 I. 48-50.

The third U.S. patent to Chen, U.S. Pat. No. 7,444,041, expired in 2012 by failure to pay the first maintenance fee. Chen '041 shows another optical signaling system in circuit board, a heat sink 110, 200 made into the circuit board, and an improved waveguide 302. The heat sink has further description here, c. 9 I. 36. The waveguide 302 forms beneath cladding layers, c. 10 I. 61-67, along with the circuit board 104 c. 9 I. 58. This patent also includes an electrical to optical transmitter identified as a laser, c. 11 I. 38-50.

The fourth U.S. patent to Chen, U.S. Pat. No. 7,457,491, expired in 2012 by failure to pay the first maintenance fee. Chen '491 shows another optical signaling system in a circuit board, a heat sink as previously described in the Chen patents, a waveguide, and a new metallic foil layer, 2400. The foil layer has description as copper of one mil thickness, c. 22 I. 20-25.

And, the fifth U.S. patent to Chen, U.S. Pat. No. 7,529,448, expired in 2012 by failure to pay the first maintenance fee. Chen '448 shows another optical signaling system in circuit board, a heat sink as previously described in the Chen patents, a waveguide, and a new metallic foil layer, 2400. The foil layer has description as copper of one mil thickness, c. 22 I. 20-25.

The U.S. Pat. No. 6,845,184 to Yoshimura shows an opto-electrical system of thin, stacked layers. This patent had its second maintenance fee paid and remains enforceable to Jan. 18, 2017. The system has a substrate 10 shown in FIG. 1 with a base 12 and an active layer 20, c. 12 I. 45. The active layer includes switching devices 26 and photo detectors 28. The photo detectors convert energy between light and electricity. Waveguides 24 convey the optical signals, c. 5 I. 20, 40-45. FIG. 3 further shows a switch 26 which may have a cladding 23, c. 7 I. 23, 30, 63. The switch operates by electrically caused magnetic fields that redirect light, c. 7 I. 63, c. 8 I. 1-5.

The U.S. publication to Cho, No. 2004/0037512, shows an electro-optical circuit board with a waveguide. Claim 4 on page 5 listed features for an optical transmit/receive module. This publication then became Cho's U.S. Pat. No. 6,877,912.

The U.S. Pat. No. 7,786,919 to Parfitt provides systems for providing isolated analog outputs or inputs.

The U.S. Pat. No. 8,098,993 to Kirkpatrick has an apparatus for transporting bus protocols over an optical link. This apparatus uses a transmission circuit, a receiving circuit, and a link controller circuit. The transmission circuit converts electrical signals to optical signals as at 53, c. 2 I. 32, c. 5 l. 65 connecting to a PCIe interface using an optical ribbon cable. The receiving circuit then converts optical signals to electrical signals as at 54, c. 2 l. 36, c. 5 l. 65. The link controller circuit detects and regulates lanes of communication from a data processing unit as at 56, 57, c. 2 l. 40, 56-60, 36, c. 5 l. 65. More particularly, transceivers 70 convert and reconvert electrical to optical signals, c. 4 l. 50.

The second U.S. Pat. No. 8,352,651 to Parfitt describes devices for PLC communications. The devices of Parfitt '651 include a signal interface and an opto-coupler that electrically isolates an input output module from the PLC.

And, the U.S. Pat. No. 8,532,500 to Wach provides a method for receiving optical signals. This method has an optical signal of various wavelengths, phases, or synchronizations, split by using detectors of separate wavelengths where the detectors then output an electrical signal, as at c. 3 l. 7-10. The detectors 211, 212, receive incident light but register and output only from select wavelengths as described in c. 10 l. 30-31, 33-50. Wach also mentions the term waveguide, 125, that directs or steers light within a course, as at c. 6 l. 64-c. 7 l. 3. Wach's patent also has a receiver 100 that has the optical components grown on a common substrate from select materials such as lithium nobate, as at c. 8 l. 25-27.

The present invention overcomes the disadvantages of the prior art and provides an electrical conductor to optical input conversion system. The present invention converts the electrical signals from currents and voltages over conductors to light over fiber optics. The present invention reduces in optical systems the electrical surge hazard, electrical faults, and electrical shock potentials to personnel when voltages approach 120V. The optical sensing end of this system may deploy in high magnetic fields, underwater, and can touch high voltage potentials or conductors exposed to lightning strikes with no ill effects unlike the traditional conductor based input systems. The optical usage of this invention eliminates lightning or fault surge hazards or any other phenomenon that can be carried by conductor capable of damaging the electrical inputs of a PLC or any other electrical based system. All of these hazards do not pass over optical cables. The present invention converts the electrical signals from currents and voltages over conductors to light over fiber optics.

SUMMARY OF THE INVENTION

The electrical conductor to optical input conversion system invention has at least one circuit, an optical loop, and a peripheral in combination that take an electrical signal, convert it to optical signal, act on that signal by means of physical interaction with the peripheral device, and return an optical signal to the circuit which is converted to an electrical signal. The circuit receives power from a control voltage source or an existing voltage sent out by an electrical input circuit, such as a discrete input card of a PLC system. The circuit will provide a light source for the optical loop. The optical loop has a send optic cable, an optical peripheral that acts on the line of sight of the optical send cable, and an optical return cable which carries the acted on signal back to the circuit. The circuit then receives this light signal and converts it to a voltage or current as needed for use by any electrical based system.

The main parts of this invention's system have three circuits and two peripheral devices that support either discrete or analog signals. The first circuit provides a light source, either constant on, turned on and off by an electrical discrete input, or varied in intensity from an electrical analog input. This allows placement in series with an existing electrical signal. Alternatively, the invention may have a placement in parallel with an existing electrical signal. The second circuit receives discrete input levels of light and converts them to an open or closed contact for discrete electrical signal manipulation. If it receives a light signal from the optical loop, then it will close the contact for the existing electrical circuit. It may open the contact if needed. It can also have a set of contacts, opening one, and closing the other like a C form contact. Alternatively, it can output a voltage instead of manipulating a dry contact. The second circuit may use any output that provides a discrete input for an electrical system. The third circuit has similarities to the second circuit but operates upon analog signals. It receives an optical signal of varying light intensity, and converts it to an analog signal used by an electrical system. The range of light will vary for each implementation of this circuit so this third circuit adjusts. The output falls in the range of about 0 V DC to about 5V DC or about 4 mA DC to about 20 mA DC or other analog signal standard used by an electrical system. This third circuit also provides an analog input for an electrical system.

The first peripheral device includes an optical limit switch which either breaks or allows the passage of light from the send loop to the return loop. This first peripheral device operates as a normally open device where light is blocked when the limit switch is not acted upon, and allows the passage of light when the limit switch is acted upon. This first peripheral device may alternatively operate as a normally closed device where light is allowed to pass when the limit switch is not acted upon, and blocks light when the limit switch is acted upon. The second peripheral device provides a limit switch which moves a window as stress befalls the second peripheral device. The window has varying transparency levels, or tint, which allow varying intensities of light to pass, such as from opaque to transparent, and varying gradually and linearly. The window operates in various modes such as allow all light to pass when not acted upon or stressed, block all light when fully acted upon, and linearly vary the intensity of light when acted upon through its entire range of motion. The window may alternatively operate to block all light when not acted on and allow increasing light linearly until fully acted upon, at which point it allows all light to pass. These peripheral device, typically limit switches, illustrate components of the invention though the Applicant foresees other peripheral devices capable of translating a real world indicator into a physical motion which can block for discrete levels of light or block light at varying degrees with a transparency varied window.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide an electrical conductor to optical input conversion system that converts an electrical signal to an optical signal.

Another object is to provide such an electrical conductor to optical input conversion system that operates with light wavelengths used by industry.

Another object is to provide such an electrical conductor to optical input conversion system that is capable of manufacture and distribution at a price suitable for the end customers, supply houses, retailers, and catalogs to provide.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 4 shows a circuit diagram for a light source;

FIG. 5 shows a circuit diagram for a discrete level receiving module that switches solid state relay output with common emitter configured transistor;

Figure 1:
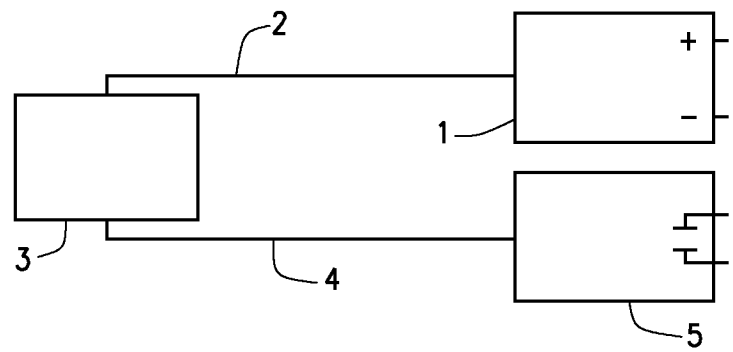
FIG. 1 shows a basic block diagram of optical input system with a light source, an optical loop, a discrete peripheral device, and a discrete receiving circuit that outputs as dry contact.

REFERENCE NUMERALS IN FIGURES:

1 light source circuit
2 optical send loop
3 discrete level optical peripheral
4 optical return loop device
5 discrete level receiving circuit with dry contact output
6 discrete level receiving circuit with voltage/current output
7 analog level optical peripheral device
8 analog level receiving circuit
9 input power conditioning circuit
10 switch mode power supply
11 resistor
12 zener diode
13 light source
14 photo diode
15 diode
16 solid state relay
16A analog voltage or current source
17 transistor
18 power supply electrical terminals
19 electrical output terminals
20 circuit module housing
21 send or transceiver optical receptacle
22 return or receiver optical receptacle
23 discrete level peripheral device housing
23A peripheral device housing narrow cavity
23B peripheral device housing wide cavity
23C normally open logic through hole
23D normally closed logic through hole for discrete level peripheral device for discrete level peripheral device
23E tapped hole
24 discrete level actuating aim
24A actuating arm feet
24B discrete level aim slotted hole
25 analog level peripheral device
25A through hole for analog level housing peripheral device
26 analog level actuating arm
26A analog optical window
27 spring
28 cover plate
29 machine screw
30 optical cable receptacle
31 real world input coupling The same reference numerals refer to the same parts throughout the various figures.

DESCRIPTION OF THE PREFERRED EMBODIMENT

The present invention overcomes the prior art limitations by providing an electrical conductor to optical input conversion system. FIG. 1 shows a basic block diagram for the optical system working in a typical discrete input loop. Typically, this loop has a real world input device, such as a limit switch, pressure switch, float switch, and the like, closing an electrical contact when activated. The optical loop of the present invention has to detect this real world input. A light source circuit 1 sends a out, or generates, a constant source of light through an optical send loop 2. A discrete level optical peripheral device 3 is acted upon by real world input, which then acts on, or processes, the light: letting it pass when activated or blocking it when not activated, related to an existing electrical contact would have been. The optical return line of the loop, as at 4, returns light when active or no light when not active. A discrete level receiving circuit 5 senses the presence or absence of light from the optical return line 4. When discrete level receiving circuit 5 senses light, it will close a dry electrical contact via solid state relay, mechanical relay, or other conventional means. The discrete level receiving circuit 5 may close the contact when light is present or alternatively close the contact when light is not present. The discrete level optical peripheral device 3 may allow light to pass when active and block light when not active, or it may block light when active and allow light to pass when not active.

Figure 2:
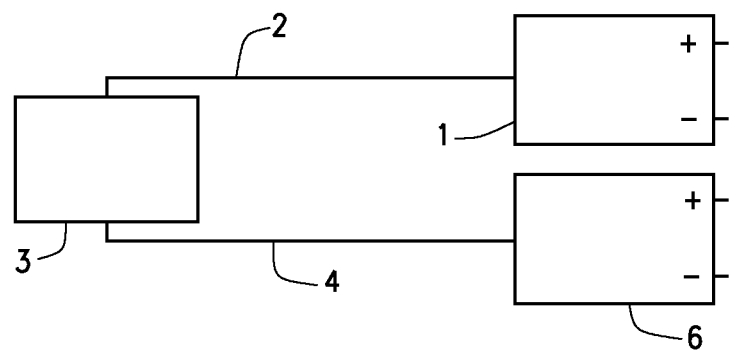
FIG. 2 shows a basic block diagram of optical input system with a light source, an optical loop, a discrete peripheral device, and a discrete receiving circuit that outputs as discrete level voltage or current source.

FIG. 2 shows a basic block diagram for the optical system working in a discrete input loop that monitors for a voltage or a current source output instead of a dry contact as in FIG. 1. Typically, this loop has a real world input device, such as a limit switch, pressure switch, float switch, and the like tied into a circuit that outputs a voltage or a current when active or no voltage or no current when inactive. The optical loop has to detect this real world input as the light source circuit 1 sends out a constant source of light through the optical send loop 2. The optical send loop includes an optic cable with two ends and one end has a coooperating connector. The discrete level optical peripheral device 3 is acted upon by real world input, which then acts on the light: letting it pass when activated or blocking it when not activated similar to the above mentioned electrical contact. The optical return line 4 of the loop returns light when active or no light when not active. A discrete level receiving circuit 6 senses the presence or absence of light from optical return line 4. When discrete level receiving circuit 6 senses light, it outputs a discrete level of a voltage or a current depending on the circuit to which it outputs. The discrete level receiving circuit 6 may then output a current or a voltage when light is present or alternatively output a current or voltage when light is not present. The discrete level optical peripheral device 3 may allow light to pass when active and block light when not active, or may block light when active and allow light to pass when not active.

Figure 3:
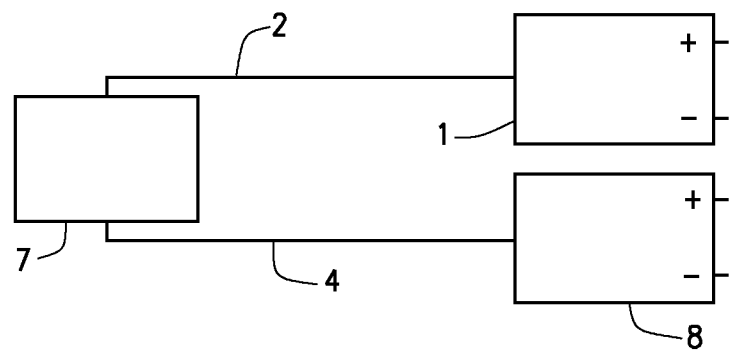
FIG. 3 shows a basic block diagram of optical input system with a light source, an optical loop, an analog peripheral device, and an analog receiving circuit that outputs as analog level voltage or current source.

FIG. 3 shows a basic block diagram for the optical system working in an analog input capacity that monitors for a voltage or a current source of varying levels instead of discrete or digital levels as previously described in FIGS. 1, 2. Typically, this loop has a real world input device such as a set of reed switches, pressure switch, a transducer, and the like that tie into a circuit that outputs a voltage from 0V DC to about 5V DC corresponding to a range of real world input, or from 4 mA to 20 mA as a current source. As above, the optical loop detects this real world input through the light source circuit 1 sending out a constant source of light as before through the optical send loop 2. An analog level optical peripheral device 7 also is acted upon by real world input, which then acts on the light: letting analog levels of light pass as it moves from fully acted upon to not acted upon. This operation blocks all light when not acted on, blocks no light when fully acted on, and blocks linearly varying levels of light from all to none along the full stroke path of the device. The optical return line 4 of the loop returns an analog light level. An analog level receiving circuit 8 senses the analog varied levels of light from optical return line 4. When analog level receiving circuit 8 senses light, it outputs a corresponding voltage or current. The analog level receiving circuit 8 may vary its electrical output directly proportional to the light level it receives, or alternatively inversely proportional to the light level it receives. The analog level optical peripheral device 7 may allow more light the more it is actuated, or alternatively it may allow less light upon its actuation.

FIG. 4 shows a basic optical light source circuit. From the left, a power source appears as a component of the invention. This source could may have any voltage level, alternating current (AC) or direct current (DC), and an input filter 9 then rectifies and filters AC voltage to DC voltage. For, when AC input is too high, the present invention includes a transformer as part of the input voltage conditioning circuit, as at 9. A switch mode power supply 10 would then buck or boost the DC voltage to a manageable level to power the light source. The manageable level yields useable voltages for the circuit. A light source 13 appears as an LED, but Applicant can foresee a laser diode, fiber optic circuit, or other light source compatible with optical circuits. Thus, this circuit and the switch mode power supply 10 have modular form to support the various currents and voltages required by the various light sources. This circuit operates with light at wavelengths and intensities compatible with standard fiber optics. With that in mind, resistors 11 make up a voltage dividing bridge in conjunction with a voltage conditioning zener diode 12 to hold constant voltage across our light source, in this case, an LED as at 13. Some light sources need a regulated current source instead of a voltage source. This shows one light for simplicity, but the source circuit can power as many light sources as needed for a given application. This circuit cooperates with the optic receiving circuit so all electrical to optical conversion processes happen in the same module.

Light at wavelengths and intensities compatible with standard fiber optics include at present:

O-band, 1260-1360 nm, Original band, PON upstream
E-band, 1360-1460 nm, Water peak band
S-band, 1460-1530 nm, PON downstream
C-band, 1530-1565 nm, Lowest attenuation, original DWDM band, compatible with fiber amplifiers, CATV
L-band, 1565-1625 nm, Low attenuation, expanded DWDM band
U-band, 1625-1675 nm, Ultra-long wavelength.

The present invention operates upon POF wavelengths, "plastic optical fiber," at least as low as 399 nm and up to at least as high as 1801 nm.

FIG. 5 shows a discrete level receiving circuit which has an optical input and converts it to an electrical conductor contact opening or closing. This circuit appeared in FIG. 1 as the discrete level receiving circuit 5 with dry contact output. Voltage Vcc comes from the voltage conditioning parts of the circuit as in FIG. 4. From left to right, FIG. 4 shows a photo diode 14 to block current flow to the base of a transistor 17 and the resistor 11. The photo diode operates to saturate a transistor or an input to an operational amplifier, or opamp, for switching a solid state relay. The transistor includes a load current capable transistor. Further, the transistor has a linearly variable output with a bias in a linear operating region. The relay contacts and the output of the receiving circuit provide a dry contact for an indication of the position of the optical peripheral device. With no current flow through resistor 11, no voltage potential exists from base to emitter of transistor 17. Therefore the transistor 17 does not conduct, and it acts as an open switch preventing the operation of a solid state relay 16. With the solid state relay off 16, the dry contact under its control opens. The output to an electrical circuit, presumably a discrete input PLC based card is then off. Diodes, as at 15, are used to cut off the solid state relay when transistor 17 does not conduct. Diodes do not see use in the presence of a mechanical relay. When a photo diode 14 does detect light from the optical return loop 4 in FIGS. 1, 2, 3, it conducts. With current flowing through the photo diode 14, the resistor 11 drops a voltage. With voltage across the resistor 11, transistor 17 has bias from base to emitter to conduct. With transistor 17 conducting, current flows from Vcc through the solid state relay 16 picking it up. This closes the dry contact associated with solid state relay 16. This shows a working circuit that takes an optical signal and converts it to an electrically useable contact typically seen at the real world peripheral device. Here, the real world input takes place with the optical device in this invention, isolated from the electrical circuit. The receiving circuit may have its own housing that also contains the power supply, terminals for the power supply, and terminals for dry contact electrical output.

Figure 6:
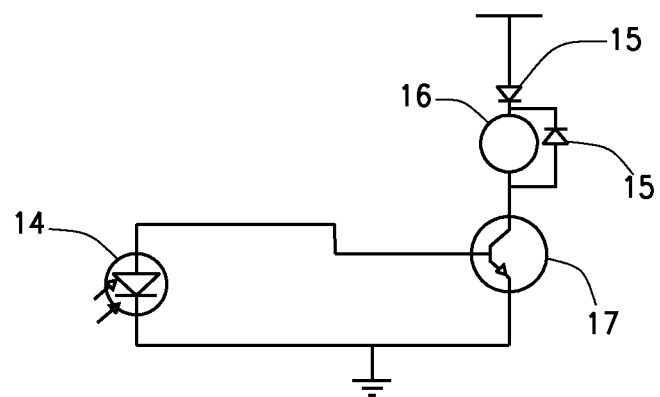
FIG. 6 shows a circuit diagram for a discrete level receiving module that switches solid state relay output with common base configured d transistor.

FIG. 6 shows a circuit that accomplishes the same task as previously described in FIG. 5: converting an optical signal to a dry contact electrical signal. Again Vcc and ground come from voltage conditioning portions of the optical light source circuit as in FIG. 4. When an optical signal triggers a photocell 14, it will conduct. This common base configuration grounds the base, but creates a potential from Vcc to ground through the base which conducts transistor 17. With transistor 17 conducting, the solid state relay 16 picks up and closes its associated dry contact. When the photocell 14 does not detect an optical input it does not conduct, transistor 17 then cuts off and does not conduct, thus acting as an open in line with 16 solid state relay. The diodes 15 cut off current flow and force the solid state relay 16 to turn off and open the associated dry contact. The solid state relay 16 may also include a conventional relay, a MOSFET type transistor, and the like, as to control a dry contact through electrical means. FIGS. 5, 6 both show discrete level receiving circuits 5 from the block diagram of FIG. 1. This contact in FIGS. 5, 6 may have wetting which places it in line with a voltage or a current source and which converts it to the discrete level voltage 6 or current source circuit from FIG. 2. This outputs a discrete level voltage or current source instead of just opening or closing a dry contact. This contact may turn the source on when light is seen, or turn it off when light is seen using normally open or normally closed contacts as needed for the function of the circuit.

Figure 7:
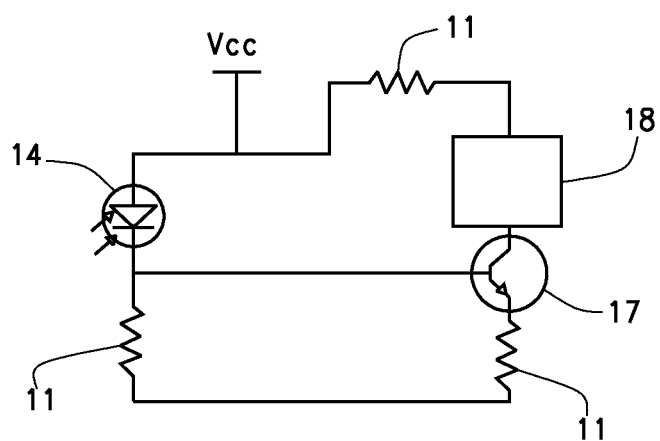
FIG. 7 shows a circuit diagram for an analog level receiving module that controls an analog voltage or current source through transistor amp biased in its linear operating region.

FIG. 7 shows an analog light receiving circuit which converts varying (analog) levels of light into varying (analog) levels of electrical current or voltage. This circuit previously appeared in FIG. 3 as the analog level receiving circuit 7 with voltage or current source output. Vcc and ground come from voltage conditioning portions of light source circuit from FIG. 4. The Vcc source has resistors 11 sized to operate a transistor 17 in the linear operating region, whereas FIGS. 5, 6 showed the transistor 17 in either cutoff or saturation. In this way, varying currents or voltages seen at the base of transistor 17 result in an amplified yet proportional voltage or current signal at a voltage or current source circuit 18. The voltage or current source circuit 18 outputs either a voltage from 0V DC to about 5V DC for the entire range of transistor 17 operating current, or outputs a current from about 4 mA to about 20 mA representing the operating current range of transistor 17. The photo diode 14 is preferably an analog photo diode allowing various levels of current flow directly proportional to the levels of light it senses. Low levels of light will cause photo diode 14 to conduct low levels of current, and high levels of light will cause it to conduct high levels of current. The more current photo diode 15 conducts, the more voltage arises across the base to emitter junction of transistor 17 and the more transistor 17 will conduct. The more transistor 17 conducts, the more voltage or current will be output from a voltage or current source circuit 16A. This shows how an optical signal converts in analog form to an electrical output in conventional levels seen in analog input cards.

Figures 8A, 8B:
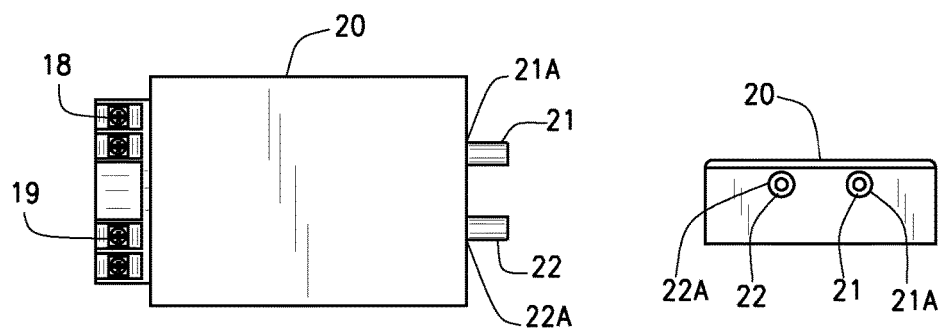
FIG. 8A shows a top view of a single channel a light source and a receiving optical module with power supply input and electrical signal output terminals.
FIG. 8B shows a side view of a single channel optical input module viewing the optical loop output and receiving receptacles.

FIGS. 8A, 8B, 8C, 8D show several views of a circuit module. This module holds a combination of power supply circuit, light source circuit, optical receiving circuit, and electrical signal output circuit, as discussed in FIGS. 1-7. FIG. 8A then shows a top view of the module, with screw type terminals on the left, and optical receptacles on the right. Though screw terminals appear, the Applicant foresees other electrical connection types may see use for the electrical terminals and other optical receptacle types may see use for the optical receptacles. For example, screw type terminals 18 attach an electric power source to the module. This can be 120V AC, or other voltage as discussed above in relation to FIG. 4. This can also be powered from the existing input circuit. For example, a conventional discrete input card that sends out 24V DC and looks for a return voltage through a dry contact can power this module with the 24 V DC sensing voltage. Screw type terminals, as at 19, connect the outgoing electrical output to the PLC input card. This would be the output of blocks 5, 6, and 8 in FIGS. 1, 2, 3, respectively. The electrical discrete, or analog input, card would connect here to either monitor for an active voltage or current for the system as shown in FIGS. 2, 3, or to monitor a dry contact for the system as shown in FIG. 1. A module housing 20 has molded polymer form or 3D printed enclosure which houses the circuitry as described in FIGS. 1, 2 and physically supports the electrical and optical connections external to the module. A send or transceiver optical receptacle 21 couples the light source 13 from FIG. 4 to the send loop optical cable 2 from FIGS. 1-3. The send receptacle 21 connects into the housing through its penetration 21A, or through hole. A return or receiver optical receptacle 22 couples the return loop optical cable 4 from FIGS. 1-3 with the photo diode 14 from FIGS. 5-7. The return receptacle 22 connects into the housing through its penetration 22A, or through hole. This form of this module shows its components for clarity in FIG. 8. This module has a single channel, with one optical loop, and one electrical output that works as light is sensed from the optical loop to output discrete or analog signals as required by the coupled electrical circuit. This module may have as many channels as needed, and has a set of optical receptacles 21, 22, and electrical output connection 19 for each additional channel. The invention provides only one power supply connection 18 per module. This module may also communicate talk directly to Programmable Logic Control Central Processing Units through a protocol. This module nearly eliminates the need for a conventional discrete input or analog input card, replacing it entirely with an all optical input card.

FIG. 8B shows a side view of the circuit module detailing the location of a optical transceiver receptacle 21 and an optical receiver receptacle 22.

Figure 8C:
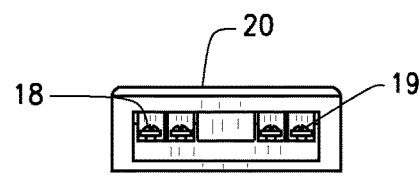
FIG. 8C shows a side view of a single channel optical input module viewing the power supply terminals and the electrical output terminals and opposite that of FIG. 8B.

FIG. 8C shows the opposite side view of the circuit module detailing the location of electrical connections.

Figure 8D:
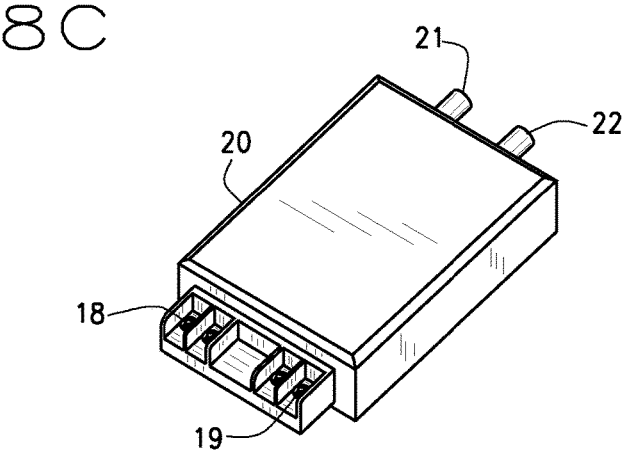
FIG. 8D shows an isometric view of a single channel light source and a receiving optical module with power supply input and electrical signal output terminals.

FIG. 8D shows an isometric view of the circuit module for clarity.

Figure 9A:
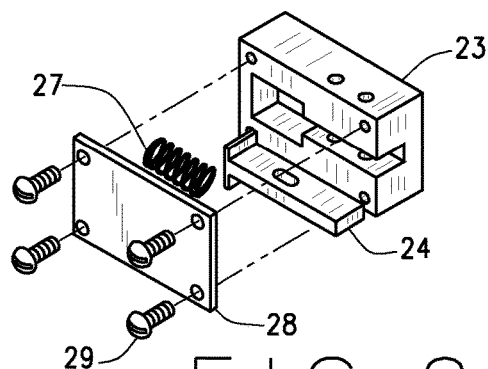
FIG. 9A shows an exploded view of the discrete level optical peripheral device.
Figure 9B:
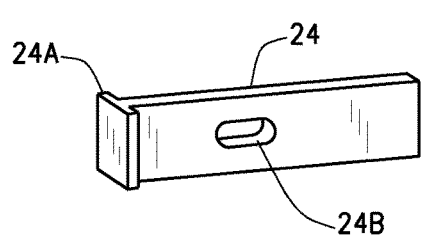
FIG. 9B shows a perspective view of the actuating arm of the discrete level optical peripheral device.
Figure 9C:
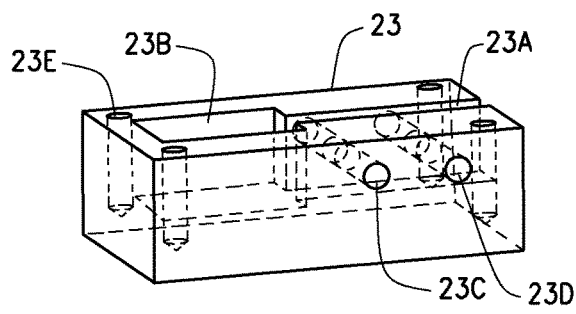
FIG. 9C shows a perspective view of the body of the discrete level optical peripheral device.

FIGS. 9A, 9B, 9C show the construction and contents of a discrete level optical peripheral device. This device appeared previously as block 3 in FIGS. 1, 2. FIG. 9A shows the device exploded, with the basic construction and contents appearing. A housing 23 for the discrete level optical device has a body, or housing body also using reference character 23, with a cavity, more precisely a narrow cavity, allowing an actuating arm 24 to pass through it. It also houses a spring 27, or other biasing member, to keep pressure on the actuating arm to keep it fully extended when at rest. The spring spans within the narrow cavity and between a wall of the body and an end of the actuating arm. The spring urges the actuating arm to extend outwardly from the body so that a user may push it inwardly to the housing towards full depression as later discussed. A cover plate 28 with four holes on its corners allows four machine screws 29, or mechanical fasteners, to fasten the plate to the body 23 using tapped holes as at 23E. When fully assembled, the peripheral device has an entire seal from any light between the cover plate 28 and the body 23. The Applicant also foresees the cover plate fixing, or attaching, to the housing body by thermal welding, chemical welding, adhesives, or cohesives suitable for bonding the materials of the cover plate and the housing body.

FIG. 9B shows a detailed isometric view of the discrete level actuating arm 24. This arm slides into the body against spring pressure and either allows light to pass or blocks light from passing from optical send line 2 to optical return line 4 from FIGS. 1-3. A real world device, not shown, applies the pressure to move this arm. A slotted hole 24B allows light to pass through the actuating arm. The slotted hole 24B extends lengthwise along the actuating arm. At least two retaining feet 24a capture the arm within the body's wide cavity. This way, spring pressure does not push the actuating arm out of the assembly, and a stopping point exists for the at rest state of the arm.

FIG. 9C shows the discrete level peripheral device body 23 in an isometric view. The body has a cavity of two parts: a narrow portion 23A and a wide portion 23B. The narrow portion 23A houses the majority of the actuating arm 24, with the exception of the feet 24a of the actuating arm, which will not fit, and have locations in the wide portion of the cavity, as at 23B. Each of the feet has a width larger than that of the narrow cavity. The actuating arm and narrow cavity have a width as narrow as practical, the actuating are being slightly thinner or of less width than of the narrow cavity. This allows the most light to pass from the send loop 2 to the return loop 4. The wide portion 23B also houses the spring 27 and has a size to hold the spring and feet of the actuating arm to provide room for the actuating arm to slide into the body against spring pressure when acted on by a real world input, and also grasp the actuating arm feet when the actuating arm is not acted on by a real world input such that it stops the arm from ejecting from the body from spring pressure. Two holes penetrate the body 23 along the z-axis as shown in FIG. 9C, that is, generally parallel to a plane defined by the cover plate 28. The two through holes, as at 23C, 23D, have a transverse orientation to the narrow cavity and the through hole shown as 23C, alternatively known as the first through hole, appears closer to the wide cavity of the body and the through hole shown as 23D, alternatively known as the second through hole, appears farther from the wide cavity of the body. In conjunction with the slotted hole 24B in the actuating arm 24, these through holes allow light to pass from the optical send line 2 to the optical return line 4 as previously shown in FIGS. 1-3. Further, housing body 23 aligns any connectors, though typically fiber optic, with the through holes 23C, 23D, 25A.

Figure 10A:
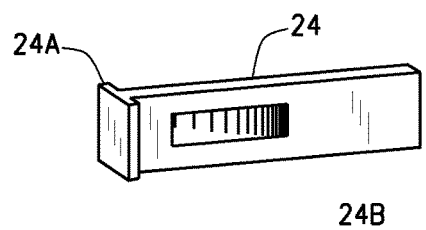
FIG. 10A shows a perspective view of an actuating arm of an analog level optical peripheral device.
Figure 10B:
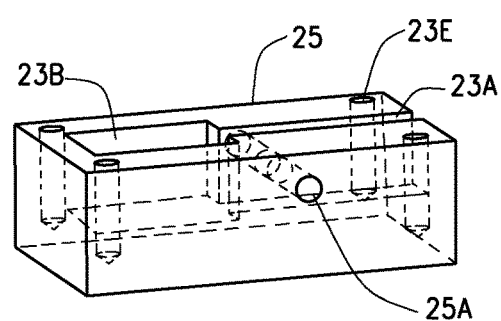
FIG. 10B shows a perspective view of the body of the analog level optical peripheral device.

FIGS. 10A, 10B show the body and actuating arm of the analog peripheral optical device. This device appeared previously as block 7 in FIG. 2. Only an analog actuating arm 26 and an analog peripheral device body housing 25 are shown in FIG. 10A and 10B. The arm and housing see use in conjunction with the spring 27, the cover plate 28, and the machine screws 29 with similar arrangement and construction as the discrete level optical peripheral device shown in FIG. 9A. The analog actuating arm 26 has similar physical dimensions to the discrete level actuating arm 24, specifically the feet 24A operate as previously described in FIG. 9. The analog actuating arm 26 differs from the discrete actuating arm 24 in that it does not simply have a round hole in it. Instead, it has a window 26a, or lens, inserted into it with varying transparency.

The analog optical window 26a has two opposite ends and is opaque at one end, and transparent at the other end with varying levels of transparency in between. As the analog actuating arm 26 slides into the analog peripheral device housing 25, the light becomes more and more attenuated by the increasing opacity of the window. A through hole 25a, or penetration, provided in the body receives the send line of the optical loop 2 in FIG. 3 to couple with the analog peripheral device. Light will pass through this hole, for action as described above by the analog optical window 26A. Light will be attenuated directly proportional to how far the window is moved, this way light returning through the optic return cable 4 varies proportionally to how far the analog actuating arm 26 is moved by the real world input.

For example, a valve stem coupled to the actuating arm 26 would indicate how far open the valve is in real life. When fully closed, the valve stem would fully depress the actuating arm 26, and light through the through hole 25a would be completely blocked by the opaque end of the analog optical window 26a. It would return no light through the optic return line 4. The analog level receiving circuit 8 would read no light, and output 0 V (or 4 mA) to the analog input card monitoring the output of the transmitter/receiver module 20. Now as the valve opens, it depresses the analog actuating arm 26 less and less into analog peripheral device body 25, specifically changing the relative position of the analog optical window 26a as seen by the through hole 25a. This allows more and more light through. At half open, half the light passes, and the analog level receiving circuit 8 will output 2.5V (or 12 mA) which is half the respective range of 0 to 5V (or 4-20 mA). At full open, the valve stem will have moved the analog actuating arm 26 to its fully extended position out of the analog peripheral device body 25. This places the through hole 25a in line with the transparent end of the analog optical window 26a, allowing all light to pass. The analog level receiving circuit 8 sees this light level and outputs 5.0V (or 20 mA) to the monitoring electrical circuit. This shows how a real world device can manipulate an optic signal on an analog scale. The Applicant foresees reversing the opaque and transparent ends of the analog optic window 26a if an embodiment of the invention calls for it.

Figure 11A:
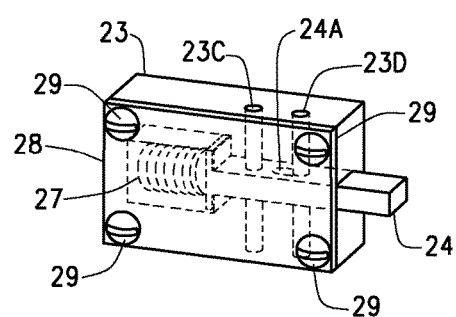
FIG. 11A shows an isometric view of a discrete level optical peripheral device with the actuating arm fully extended.
Figure 11B:
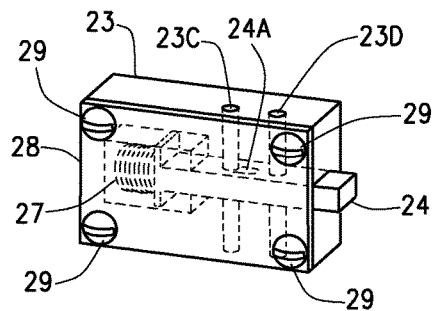
FIG. 11B shows an isometric view of the discrete level optical peripheral device with actuating arm fully depressed.

FIGS. 11A, 11B show the discrete level peripheral device in isometric views. FIG. 11A shows the discrete level peripheral device with the digital actuating arm 24 fully extended with the peripheral device at rest and not acted on by real world input.

FIG. 11B shows the device with the digital actuating arm 24 fully depressed after being acted on by real world input. The spring 27 acts on the actuating arm 24 to keep it fully extended with no real world input in the opposite direction as the spring tension. At rest, as shown in FIG. 11A, light can pass the through holes 23D in line with the actuating arm's slotted hole. At rest, as shown in FIG. 11A, light cannot pass the through holes 23C because the actuating arm's slotted hole is not in line, and the digital actuating arm 24 blocks the light from passing as the actuating arm 24 has full extension. FIG. 11B shows the same discrete level peripheral device with the digital actuating arm fully depressed following real world input. Fully depressed, light cannot pass the through holes 23d as they do not line up with the actuating arm's slotted hole, and the digital actuating arm 24 blocks the light from passing. With the actuating arm 24 fully depressed, that is full depression, light can now clear the through hole 23C as it now lines up with the actuating arm's slotted hole 24A. This setup allows for normally open or normally closed logic as it relates to the discrete input card monitoring this system's output.

Figure 12A:
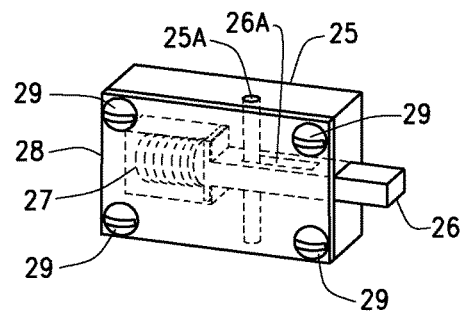
FIG. 12A shows an isometric view of the analog level optical peripheral device with actuating arm fully extended.
Figure 12B:
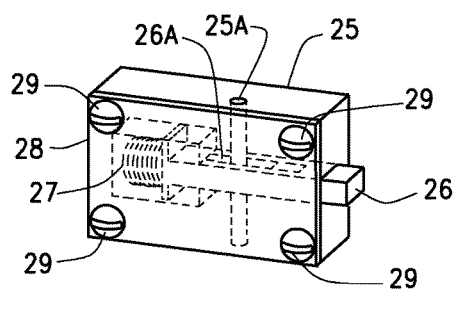
FIG. 12B shows an isometric view of the analog level optical peripheral device with actuating arm fully depressed; and, FIG. 13 shows a bottom view of a typical optical peripheral device identifying optical receptacle locations and real world input locations outlined.

FIGS. 12A, 12B show the analog level peripheral device in isometric views. FIG. 12A shows it with the analog actuating arm 24 fully extended with the peripheral device at rest and not acted on by real world input.

FIG. 12B shows the device with the analog actuating arm 26 fully depressed following real world input. The spring 27 acts on the actuating arm 26 to keep it fully extended with no real world input in the opposite direction as the spring tension. At rest and fully extended, as shown in FIG. 12A, light passes the through hole 25a in line with the fully transparent end 26A of the analog optical window. This attenuates no light as it is the fully transparent side of the window. When acted on by a real world input, the analog actuating arm 26 is depressed into the analog device body 25 until it is fully depressed. As it moves from fully extended to fully depressed, the optical window 26a blocks more and more light as described in the valve stem example for FIG. 10. This arrangement allows a directly proportional relationship with light level allowed to pass and position of the actuating arm. Once more, the Applicant foresees reversing the analog optical window 26a for an inversely proportional relationship with the light level allowed to pass and position of the actuating arm if required by the system using the device.

Figure 13:
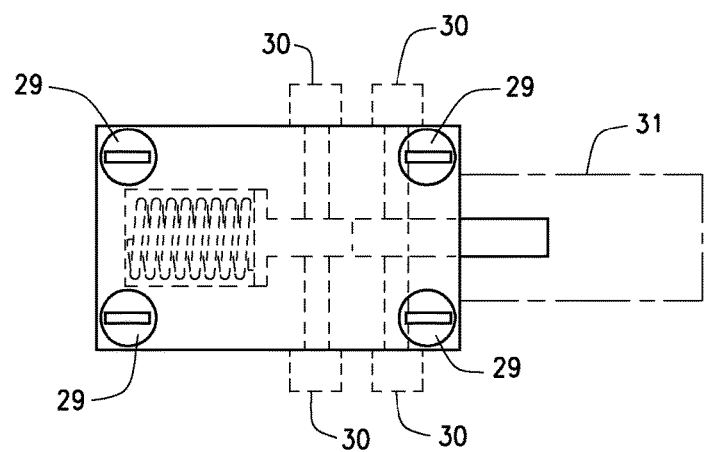

And, FIG. 13 shows a peripheral device and its connections to the optical send loop 2 and the optical return loop 4. It also details where the real world input acts on the actuating arm. At least two optical receptacles 30 appear as block diagram outlines though the Applicant foresees many other optical receptacle options. The at least two optical receptacles include fiber optic cable connectors. A conventional optical connection can be used here, such as V-PIN, MT, ST, SC, FC, or other connector type. A real world input coupling 31 appears as a block diagram outline since this device can be used with any real world input capable of moving the actuating arm. Real world input includes but is not limited to the following devices: physical limit switch, pressure switch, differential pressure switch, reed switch, magnetically pulled in or repelled switch, temperature switch, centrifugal force operated switch, or any other conventional real world device used in PLC systems to monitor real world conditions that can act on the actuating arm 24 or the analog actuating arm 26.

From the aforementioned description, a electrical conductor to optical input conversion system has been described. The electrical conductor to optical input conversion system is uniquely capable of converting electrical signals to optical input in a switch. The electrical conductor to optical input conversion system has a sliding window for varying the degree of conversion from optical to electrical signal. The electrical conductor to optical input conversion system and its various components may be may be manufactured from many materials, including but not limited to, steel, aluminum, polymers, ferrous and non-ferrous metal foils, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like -when they appear-are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An optical input system, said system generating a light signal, said system processing the light signal to create a digital light signal then converting it to open or to close a dry electrical contact, the light signal within a range of light wavelength from at least as low as 399 nm up to at least as high as 1801 nm, said system comprising:
- a power supply yielding useable circuit voltages;
- a light source circuit including one of an LED, laser diode, and fiber optic circuit light source, wherein said light source circuit supports standard fiber optic light wavelengths and light intensity;
- a housing for said light source circuit, said housing including a fiber optic cable connector, and a penetration from said light source circuit to said connector;
- an optic cable having two ends, said optic cable terminating on one of said ends with a cooperating connector;
- a peripheral device having a housing body with a narrow cavity, a wide cavity, an actuating arm locating within said narrow cavity, said wide cavity having a plurality of retaining feet of said actuating arm and a spring cooperatively engaging said body proximate said wide cavity and a wall upon said actuating arm, said housing body having at least one through hole transverse said narrow cavity, wherein said housing body aligns fiber optic connectors coaxial with said through hole;
- said actuating arm having a width slightly thinner than said narrow cavity and having said plurality of retaining feet each of which having a width slightly thinner than said wide cavity and larger than said narrow cavity, said actuating arm having a first slotted hole positioning to block light from passing through said through hole at full extension of said arm, said first slotted hole positioned to pass light through said through hole when at full depression of said arm against pressure from said spring, said actuating arm protruding from said body wherein said arm permits a user pushing it to full depression;
- said spring fitting within said wide cavity and maintaining said actuating arm fully extended in the absence of a real world input;
- wherein said peripheral device cooperates with any physical input device that can move said actuating arm linearly, and wherein said peripheral device connects to a light source using said optic cable;
- a cover plate enclosing said spring and said actuating arm within said housing body of said peripheral device, said cover plate cooperating with said housing body so that no light enters said narrow cavity;
- a second optic cable having two opposite ends, said second optic cable operating as a return line of an optical loop and connecting said peripheral device to a receiving circuit;
- said receiving circuit having a photo-diode wherein said receiving circuit is adapted to saturate a transistor or an input to an opamp for switching a solid state relay and said relay contacts and the output of said receiving circuit providing a dry contact for an indication of the position of said peripheral device; and,
- a housing for said receiving circuit, said housing supporting said power supply and containing terminals for said power supply input and dry contact electrical output.

2. The optical input system as described in claim 1, further comprising:
- a second slotted hole in said actuating arm, said second slotted hole locating outwardly from said slotted hole, said second slotted hole passing light through said body's through hole when said actuating arm has full extension and blocking the light through said body's through hole when said actuating arm has full retraction into said body.

3. The optical input system as described in claim 2, wherein said dry contact is wetted with one of a digital voltage source and a digital current source and the output of said dry contact is then a voltage or current respectively.

4. The optical input system as described in claim 2, further comprising a mechanical relay.

5. The optical input system as described in claim 2, further comprising a load current capable transistor.

6. The optical input system as described in claim 1, further comprising:
- said peripheral device body having a second through hole penetrating said body and said narrow cavity, said first slotted hole of said actuating arm blocking light from said first body through hole but passing light through said second body through hole when said actuating arm attains full extension.

7. The optical input system as described in claim 6, said dry contact is wetted with one of a digital voltage source and a digital current source and the output of said dry contact is then a voltage or current respectively.

8. The optical input system as described in claim 6, further comprising a mechanical relay.

9. The optical input system as described in claim 6, further comprising a load current capable transistor.

10. The optical input system as described in claim 1, wherein said dry contact is wetted with one of a digital voltage source and a digital current source and the output of said dry contact is then a voltage or current respectively.

11. The optical input system as described in claim 1, further comprising a mechanical relay.

12. The optical input system as described in claim 1, further comprising a load current capable transistor.

13. The optical input system as described in claim 1, wherein said light source is capable of being switched on and off in the presence or absence of an external electrical signal; and,
- wherein said system enters one of a series connection and a parallel connection with other switching devices.

14. The optical input system as described in claim 1, further comprising:
- said actuating arm being slightly thinner than said narrow cavity, said actuating arm having said plurality of retaining feet each of which is slightly thinner than said wide cavity and larger than said narrow cavity wherein pressure from said spring captures said actuating arm within said wide cavity and said narrow cavity;
- said actuating arm having a window therein collinear with the narrow section of said arm;
- said window varying in tint from opaque to transparent and said varying in tint occurring gradually and linearly; and,
- said window having an orientation to block light from passing said body's through hole upon full extension of said actuating arm and an orientation to pass light upon full depression of said actuating arm.

15. The optical input system as described in claim 1, further comprising:
- said receiving circuit sensing light by one of photocell, photo-diode, and photo-transistor;
- said receiving circuit having a linearly variable output of a transistor biased to operate in a linear operating region; and, said transistor producing an amplified output driving one of a voltage source and a current source to outputs 0V DC to about 5V DC and alternatively about 4 mA to about 20 mA respectively.

16. The optical input system as described in claim 15, further comprising:
said housing having electrical output terminals outputting a signal.

17. The optical input system as described in claim 1 wherein said system is adapted for multiple channels of light.

18. The optical input system as described in claim 1 further comprising:
said cover plate fixing to said housing body by one of mechanical fasteners engaging tapped holes in said housing body, thermal welding, chemical welding, adhesives, and cohesives.

19. An optical input system, said system generating a light signal, said system processing the light signal to create a digital light signal then converting it to open or to close a dry electrical contact, said system comprising:
a power supply yielding useable circuit voltages;
a light source circuit including one of an LED, laser diode, and fiber optic circuit light source, wherein said light source circuit supports standard fiber optic light wavelengths and light intensity;
a housing for said light source circuit, said housing including a fiber optic cable connector, and a penetration from said light source circuit to said connector;
an optic cable having two ends, said optic cable terminating on one of said ends with a cooperating connector;
a peripheral device having a housing body with a narrow cavity, a wide cavity, an actuating arm locating within said narrow cavity, said wide cavity having a plurality of retaining feet of said actuating arm and a spring cooperatively engaging said body proximate said wide cavity and a wall upon said actuating arm, said housing body having a through hole transverse said narrow cavity, wherein said housing body aligns fiber optic connectors coaxial with said through hole;
said actuating arm having a width slightly thinner than said narrow cavity and having said plurality of retaining feet each of which having a width slightly thinner than said wide cavity and larger than said narrow cavity, said actuating arm having at least one slotted hole positioning to block light from passing through said through hole at full extension of said arm, said at least one slotted hole positioned to pass light through said through hole when at full depression of said arm against pressure from said spring, said actuating arm protruding from said body wherein said arm permits a user pushing it to full depression;
said spring fitting within said wide cavity and maintaining said actuating arm fully extended in the absence of a real world input;
wherein said peripheral device cooperates with any physical input device that can move said actuating arm linearly, and wherein said peripheral device connects to a light source using said optic cable;
a cover plate enclosing said spring and said actuating arm within said housing body of said peripheral device, said cover plate cooperating with said housing body so that no light enters said narrow cavity;
a second optic cable having two opposite ends, said second optic cable operating as a return line of an optical loop and connecting said peripheral device to a receiving circuit;
said receiving circuit having a photo-diode wherein said receiving circuit is adapted to saturate a transistor or an input to an opamp for switching a solid state relay and said relay contacts and the output of said receiving circuit providing a dry contact for an indication of the position of said peripheral device;
a housing for said receiving circuit, said housing supporting said power supply and containing terminals for said power supply input and dry contact electrical output;
said peripheral device body having a second through hole penetrating said body and said narrow cavity, said at least one slotted hole of said actuating arm blocking light from said first body through hole but passing light through said second body through hole when said actuating arm attains full extension;
one of a mechanical relay and a load current capable transistor;
said actuating arm being slightly thinner than said narrow cavity, said actuating arm having said plurality of retaining feet each of which is slightly thinner than said wide cavity and larger than said narrow cavity wherein pressure from said spring captures said actuating arm within said wide cavity and said narrow cavity;
said actuating arm having a window therein collinear with the narrow section of said arm, said window varying in tint from opaque to transparent and said varying in tint occurring gradually and linearly, and said window having an orientation to block light from passing said body's through hole upon full extension of said actuating arm and an orientation to pass light upon full depression of said arm;
said receiving circuit sensing light by one of photocell, photo-diode, and photo-transistor, and having a linearly variable output of a transistor biased to operate in a linear operating region, said transistor producing an amplified output driving one of a voltage source and a current source to outputs 0V DC to about 5V DC and alternatively about 4 mA to about 20 mA, respectively;
said housing having electrical output terminals outputting a signal;
said cover plate fixing to said housing body by one of mechanical fasteners engaging tapped holes in said housing body, thermal welding, chemical welding, adhesives, and cohesives;
wherein said dry contact is wetted with one of a digital voltage source and a digital current source and the output of said dry contact is then a voltage or current respectively;
wherein said light source is capable of being switched on and off in the presence or absence of an external electrical signal;
wherein said system is adapted to enter one of a series and a parallel connection with other switching devices;
wherein said system is adapted for at least one channel of light; and,
wherein said system operates within a range of light wavelength from at least as low as 399 nm up to at least as high as 1801 nm.

20. An optical input system generating a light signal, processing the light signal to create a digital light signal, then converting the digital light signal to operate a dry electrical contact, said system comprising:

a light source circuit including one of an LED, laser diode, and fiber optic circuit light source, a housing for said light source circuit, said housing including a fiber optic cable connector, and a penetration from said light source circuit to said connector, wherein said light source circuit supports standard fiber optic light wavelengths and light intensity;

an optic cable having two ends, said optic cable terminating on one of said ends with a cooperating connector in communication with said light source circuit, said optic cable being in communication with said light source circuit;

a power supply connecting to said optic cable;

a receiving circuit having a photo-diode and a housing for said receiving circuit, said housing supporting said power supply and containing terminals for said power supply input and dry contact electrical output, wherein said receiving circuit is adapted to saturate one of a transistor and an input to an opamp for switching a solid state relay and said relay contacts;

a peripheral device having a housing body with a narrow cavity, a wide cavity, an actuating arm locating within said narrow cavity, said wide cavity having a plurality of retaining feet of said actuating arm and a spring cooperatively engaging said body proximate said wide cavity and a wall upon said actuating arm, said housing body having a through hole transverse said narrow cavity, wherein said housing body aligns fiber optic connectors coaxial with said through hole, said spring fitting within said wide cavity and maintaining said actuating arm fully extended in the absence of a real world input;

said actuating arm having a width slightly thinner than said narrow cavity and having said plurality of retaining feet each of which having a width slightly thinner than said wide cavity and larger than said narrow cavity, said actuating arm having at least one slotted hole positioning to block light from passing through said through hole at full extension of said arm, said at least one slotted hole positioned to pass light through said through hole when at full depression of said arm against pressure from said spring, said actuating arm protruding from said body wherein said arm permits a user pushing it to full depression;

a cover plate enclosing said spring and said actuating arm within said housing body of said peripheral device wherein said cover plate cooperates with said housing body to prevent entrance of light;

said receiving circuit producing output providing a dry contact for an indication of the position of said peripheral device;

a second optic cable having two opposite ends, said second optic cable operating as a return line of an optical loop and connecting said peripheral device to said receiving circuit;

wherein said peripheral device is adapted to cooperate with a physical input device that moves said actuating arm linearly, and wherein said peripheral device connects to a light source using said optic cable; and, wherein said system operates within a range of light wavelength from at least as low as 399 nm up to at least as high as 1801 nm.

* * * * *